United States Patent
Piller et al.

(10) Patent No.: US 10,134,530 B2
(45) Date of Patent: Nov. 20, 2018

(54) ANODE LEAD WIRES FOR IMPROVED SOLID ELECTROLYTIC CAPACITORS

(71) Applicant: KEMET Electronics Corporation, Simpsonville, SC (US)

(72) Inventors: James L. Piller, Simpsonville, SC (US); Christian Guerrero, Simsonville, SC (US)

(73) Assignee: KEMET Electronics Corporation, Simpsonville, SC (US)

(*) Notice: Subject to any disclaimer, the term of this patent is extended or adjusted under 35 U.S.C. 154(b) by 61 days.

(21) Appl. No.: 15/434,253

(22) Filed: Feb. 16, 2017

(65) Prior Publication Data
US 2017/0236649 A1  Aug. 17, 2017

Related U.S. Application Data

(60) Provisional application No. 62/296,460, filed on Feb. 17, 2016.

(51) Int. Cl.
| | |
|---|---|
| *H01G 9/15* | (2006.01) |
| *H01G 9/00* | (2006.01) |
| *H01G 9/042* | (2006.01) |
| *H01G 9/048* | (2006.01) |
| H01G 9/04 | (2006.01) |

(52) U.S. Cl.
CPC ............ *H01G 9/15* (2013.01); *H01G 9/0036* (2013.01); *H01G 9/042* (2013.01); *H01G 9/048* (2013.01); *H01G 2009/05* (2013.01)

(58) Field of Classification Search
CPC ........ H01G 9/15; H01G 9/0036; H01G 9/042; H01G 9/048

USPC ................. 361/523, 540, 531, 528
See application file for complete search history.

(56) References Cited

U.S. PATENT DOCUMENTS

| | | | |
|---|---|---|---|
| 677,127 A | 6/1901 | Gilson | |
| 2,749,299 A | 6/1956 | Wheeler | |
| 4,097,916 A | 6/1978 | Piper | |
| 4,674,009 A * | 6/1987 | Wong | H01G 9/012 29/25.42 |
| 5,869,196 A | 2/1999 | Wong et al. | |
| 6,400,556 B1 | 6/2002 | Masuda et al. | |
| 7,570,480 B2 | 8/2009 | Kim et al. | |
| 7,787,235 B2 | 8/2010 | Fujita et al. | |
| 8,066,783 B2 | 11/2011 | Takeda | |
| 2012/0257328 A1* | 10/2012 | Zednicek | H01G 9/012 361/528 |
| 2012/0300362 A1 | 11/2012 | Zhao et al. | |
| 2013/0279078 A1 | 10/2013 | Djebara et al. | |
| 2014/0025067 A1 | 9/2014 | Myung et al. | |

FOREIGN PATENT DOCUMENTS

| | | |
|---|---|---|
| EP | 2 599 522 | 6/2013 |
| JP | 2006-295075 | 10/2006 |
| WO | WO 87/04003 | 7/1987 |
| WO | WO 2014/131151 | 9/2014 |

\* cited by examiner

*Primary Examiner* — Eric Thomas
*Assistant Examiner* — Arun Ramaswamy
(74) *Attorney, Agent, or Firm* — Joseph T. Guy; Patent Filing Specialist, Inc.

(57) ABSTRACT

An improved solid electrolytic capacitor, and method of making the solid electrolytic capacitor, is described. The solid electrolytic capacitor comprises a pressed powder anode and a braided lead wire extending from the anode. A dielectric is on the anode and a cathode is on the dielectric.

36 Claims, 6 Drawing Sheets

ANODE LEAD WIRES FOR IMPROVED SOLID ELECTROLYTIC CAPACITORS

CROSS-REFERENCE TO RELATED APPLICATIONS

This application claims the priority benefit under 35 U.S.C. section 119 of U.S. Provisional Patent Application No. 62/296,460 filed on Feb. 17, 2016 which is incorporated by reference.

BACKGROUND

The present invention is related to improved solid electrolytic capacitors and more particularly to solid electrolytic capacitors comprising braided anode lead wires.

The electronics industry is constantly challenged to provide increased functionality in smaller packages. This trend, commonly referred to as miniaturization, has pushed component manufacturers to improve the volumetric efficiency of the products they produce. Though a general phenomenon, the instant application is primarily focused on solid electrolytic capacitors and improvements therein for increased volumetric efficiency.

Volumetric efficiency of a solid electrolytic capacitor is generally expressed as:

Volumetric efficiency=Capacitance×Voltage/Volume.

Since capacitor manufacturers recommend different voltage derating guidelines, and these guidelines vary with temperature and other factors, the voltage is generally taken to be the manufacturer recommended maximum voltage for a particular operating condition. For capacitors, which are essentially a rectangular prism in shape, the volume is generally calculated from the maximum dimensions of the component along the x, y and z axes and for other shapes the geometric volume of the case is used as a reasonable approximation of the volume. There are a number of methods used to improve the volumetric efficiency of solid electrolytic capacitors. An important method for the discussion herein is the utilization of anodes formed as a monolith by pressing valve metal powders thereby providing for an increased surface area per unit volume.

The surface area of valve metal powders is often expressed as the specific charge of the powder. The relationship between specific charge and surface area of a valve metal powder is derived from the general equation (1) for capacitance:

$$C=EkA/t \quad (1)$$

wherein:
C=capacitance (farads);
E=permittivity constant (8.85×10$^{-12}$ farads/meter);
k=dielectric constant;
A=anode/cathode surface area overlap (meter$^2$); and
t=dielectric thickness (meter).

Given that t, the dielectric thickness, is proportional to the formation voltage employed to form the dielectric the expression for wet capacitance can be expressed as:

$$C=EkA/V_f \quad (2)$$

wherein:
$V_f$=formation voltage
Rearranging equation (2) yields:

$$CV_f=EkA \quad (3).$$

Since E and k are constants one can see that the product $CV_f$ is proportional to the surface area of the powder. The product $CV_f$, divided by the weight of the powder, is referred to in the art as the specific charge, or the charge of the powder. Tremendous gains in the specific charge of tantalum powders has been achieved since the initial development of solid electrolytic capacitors in the 1950's. The graph in FIG. 6 illustrates the changes over a few decades. As the specific charge of a powder increases the sinter temperature decreases as also illustrated in FIG. 6.

Anodes for solid electrolytic capacitors are generally formed by etching a valve metal foil or pressing a powder of a valve metal to form a porous compact or monolith. For anodes formed from pressed powders, one or more lead wires are generally either embedded in the pressed compact or welded to an external surface of the compact. The lead wires are generally cylindrical in shape, although flat wires and ribbons have been proposed. The lead wires generally have the same chemical composition as the powder used to press the compact. For example, a tantalum lead wire is used with a pressed tantalum anode. After the anode is pressed it is sintered to form metallurgical bonds between the powder particles in the pressed compact. For lead wires which are embedded in the anode the powder also sinters to the lead wire.

As the sinter temperature increases the thickness of the necks between the powder particles, and between the powder particles and the embedded wire, increases and the charge of the powder decreases. Thus, lower sintering temperatures provide higher charge and higher volumetric efficiency of the finished device. This must be balanced by taking the robustness of the anode into consideration. If the sinter temperature is too low, the necks formed between powder particles and the embedded wire are easily broken during subsequent thermal excursions such as when the device is mounted to a circuit board. These broken necks result in short circuits during the board mount process. Capacitor manufacturers commonly use lead wire pull strength, the force required to pull the embedded wire out of a sintered anode, as a measure of the robustness of the anode. Low pull strength correlates with higher incidence of shorts at board mount. For high charge powders, where the sinter temperatures are inherently low, poor lead wire pull strength can be a major issue contributing to poor quality of the finished device.

As the volumetric efficiency of solid electrolytic capacitors increases the size of the anode decreases. Smaller anodes require smaller lead wires and shallower insertion depth. Both of these factors decrease the contact area between the anode and the embedded lead further reducing the lead wire pull strength and compromising product reliability.

Another factor driving the increased functionality of electronic circuits is increased frequency at which the circuit operates. High frequency circuits require solid electrolytic capacitors with low equivalent series resistance (ESR). The resistance of the lead wire and the connection between the lead wire and the anode contributes to the ESR of the device. Solid electrolytic capacitors employing multiple lead wires, flat wires and the like have been proposed in order to decrease these resistances.

Therefore, there is an ongoing need for improvements in the mechanical and electrical connection between the embedded anode lead wire and the anode. There also exists an ongoing need to reduce the resistance in the lead wire itself. These needs have not previously been met. Provided herein is an improved capacitor with increased mechanical and electrical connection between the anode and anode lead and a reduced resistance in the anode wire.

SUMMARY OF THE INVENTION

It is an object of the invention to provide an improved solid electrolytic capacitor, and more specifically, a capacitor with improved mechanical and electrical connection between the anode and anode lead.

It is another object of the invention to provide an improved solid electrolytic capacitor with lower resistance in the electrical connectivity between the anode and anode wire and lower resistance in the anode wire.

A particular advantage of the invention is the ability to use anode powders with higher specific charge, which can be sintered at lower sintering temperatures, without detriment to the mechanical and electrical connection between the anode and anode lead.

These, and other embodiments as will be realized, are provided in a solid electrolytic capacitor comprising a pressed powder anode and a braided lead wire extending from the anode. A dielectric is on the anode and a cathode is on the dielectric.

Yet another embodiment is provided in A method for forming a solid electrolytic capacitor. The method comprises:
pressing an anode powder with a braided lead wire therein to form an anode precursor with a braided lead wire extending therefrom;
sintering the anode precursor to form a sintered anode;
forming a dielectric on the sintered anode;
forming a cathode on the dielectric; and
electrically connecting the braided lead wire to an anode termination.

DESCRIPTION

The present invention is specific to an improved solid electrolytic capacitor and, more particularly, to an improved capacitor comprising a braided lead wire and improved performance provided thereby. The braided lead wire increases the surface area of contact between the anode and the embedded braided lead wire, resulting in greatly enhanced lead wire pull strengths. The braided lead wire also has higher external surface area, at an equivalent cross-sectional thickness, than conventional wire thereby reducing the electrical resistance between the lead wire and the anode. The problem of poor lead wire integrity and resulting poor leakage stability during board mounting operations, especially for high charge powders sintered at low temperatures, is solved by the use of a braided lead wire. The braided lead wire is especially advantageous for small and low profile anodes.

The invention will be described with reference to the figures which form an integral, non-limiting, component of the disclosure. Throughout the specification similar elements will be numbered accordingly.

Figure 1:
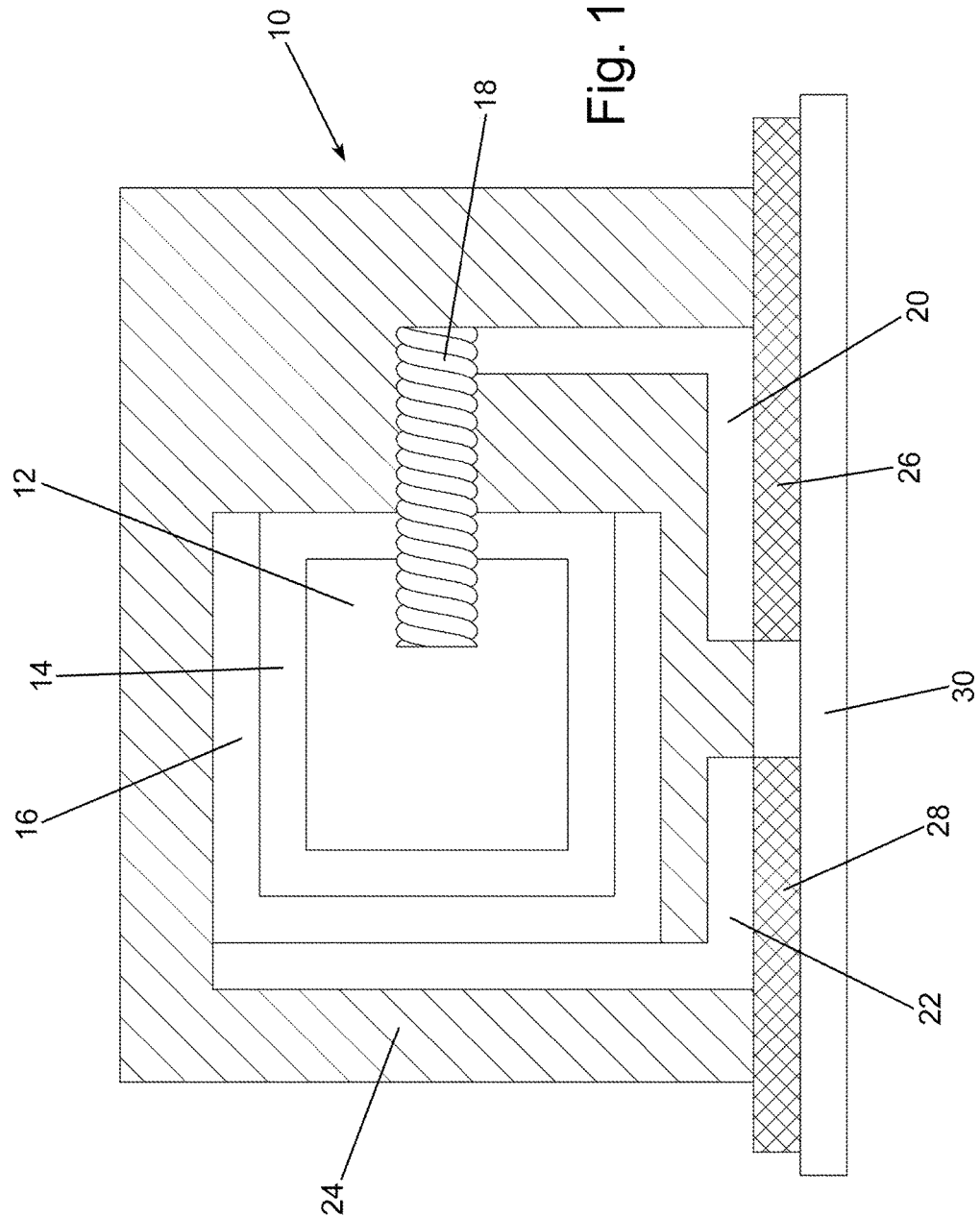
FIG. 1 is a schematic representation of an embodiment of the invention in cross-sectional view.

An embodiment of the invention will be described with reference to FIG. 1 wherein a solid electrolytic capacitor, 10, is illustrated in schematic cross-sectional view. The solid electrolytic capacitor comprises an anode, 12, with a dielectric, 14, encasing a large portion of, and preferably the entire, anode. A cathode, 16, encases a portion of the dielectric with the understanding that the dielectric is not in electrical contact with the anode. A braided lead wire, 18, extends from the anode and provides electrical contact between the anode, 12, and an anode terminal, 20, wherein the anode terminal provides an electrical and mechanical contact point with an anode trace, 26, of a circuit board, 30. A cathode terminal, 22, is in electrical contact with the cathode and provides an electrical and mechanical contact point with a cathode trace, 28, of a circuit board, 30, wherein the circuit board trace represents an electrical device. The capacitor is preferably encased in a non-conductive resin, 24, with only a portion of the anode terminal and cathode terminal exposed for mounting to the circuit traces.

Figure 2:
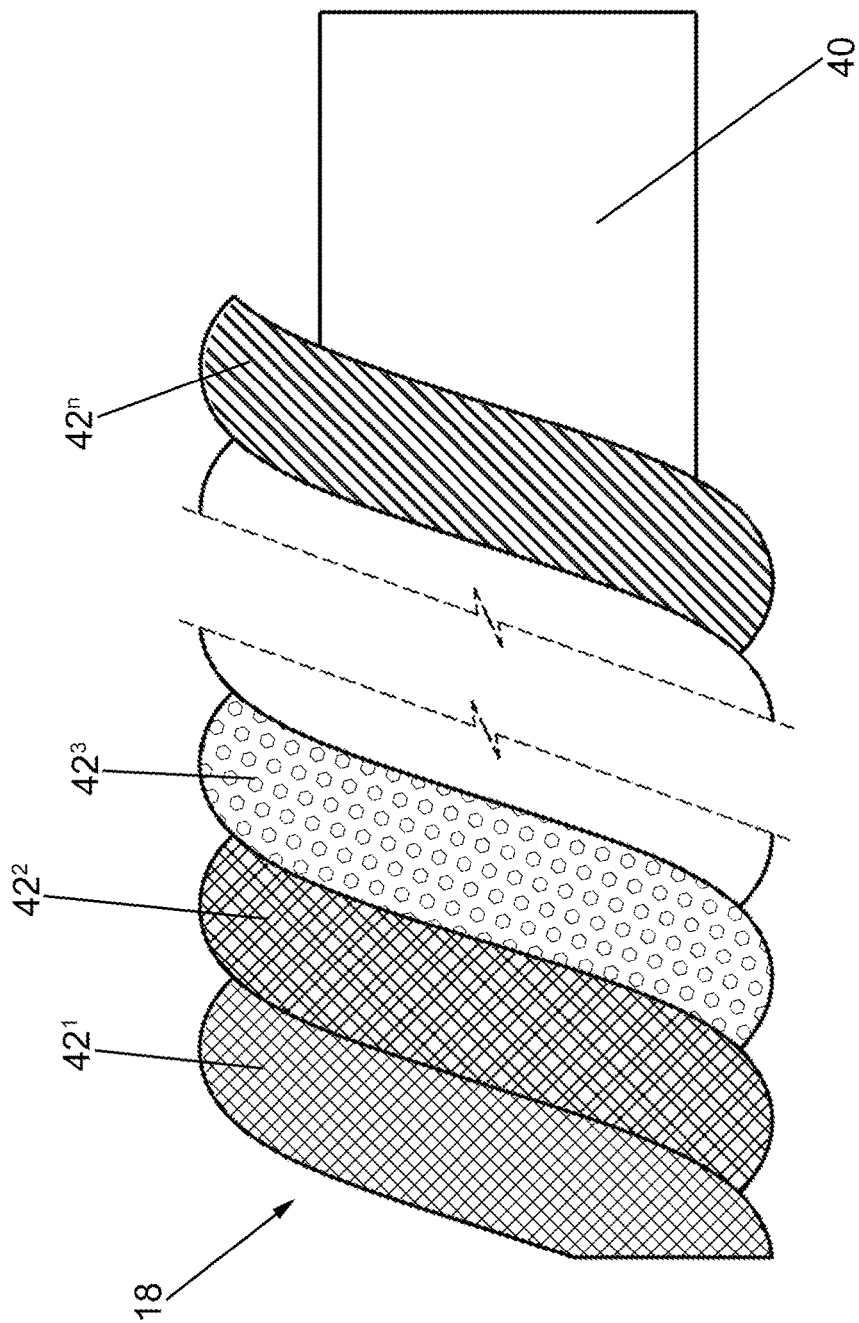
FIG. 2 is a schematic representation of an embodiment of the invention in perspective view.

The braided lead wire is illustrated in isolated schematic perspective view, in FIG. 2. In FIG. 2, the braided lead wire has a core, 40, with at least one external wrap wire wrapped around the core in helical fashion preferably with each wrap of the coil in physical contact with each adjacent wrap. In FIG. 2, the wrap, 42, can comprise a single wrapped wire or multiple wires wrapped in parallel. For clarity in the term "wrap wire" will be used herein with regards to a single wire forming a portion of the coil and the term "wrap" will refer to a wrap wire or collection of wrap wires forming the wrap. It is preferably to have at least two wrap wires wrapped in parallel wherein every adjacent wrap is an alternate wrap wire. By way of example, with two wrap wires wrapped around the core every other wrap, as viewed from the side, would be a common wrap wire and with three wires wrapped around the core every third wrap wire would be a common wrap wire. The number of wrap wires forming the wrap is limited by the ability to utilize all wrap wires for connectivity as will be discussed further herein.

With further reference to FIG. 2, the core has a first diameter and it is preferable, but not limited thereto, that the wrap wires all have a common diameter which will be referred to as a second diameter with the understanding that the second diameter is a collective term and may represent multiple diameters if the wrap wires do not have a common diameter. The core is preferably the same material as the wrap wire, however, a core which functions primarily to provide strength is contemplated wherein the core is not necessarily conductive, or has a different conductivity than the wrap wires, but provides strength to the braided lead wire. A core which is non-conductive, or a material which is of lower cost, is contemplated but not desirable. In FIG. 2 the wrap wires are indicated by a superscript which indicates an embodiment with multiple, up to n, separate wrap wires wrapped in parallel fashion with each wrap preferably in physical contact with each adjacent wrap. The number of wires is preferably at least one to no more than 10 with 2-4 being preferable. The core, or the wrap wires may be knurled. In one embodiment, the wrap wires may be knurled, to increase surface area. In one embodiment, the core and wrap wires may have matched knurling. Screw knurling is preferred in one embodiment of the invention. In one embodiment, the braided lead wire is flexible, preferably on a core, and therefore able to reduce stress at the egress of the pressed monolithic anode. The core or wrap wire may be powder coated with improved powder coating being obtained by knurling the surface to be coated. Either the core or the wrap wires of the braided lead wire are preferably at least one nanometer up to no larger than 0.75 mm and preferably at least 0.025 mm to no more than 0.25 mm. In one embodiment, the braided anode wire comprises a split braid with two cores thereby allowing the cores to be separated outside of the anode. Memory braided wire, under tension, can be used in one embodiment.

Figure 3:
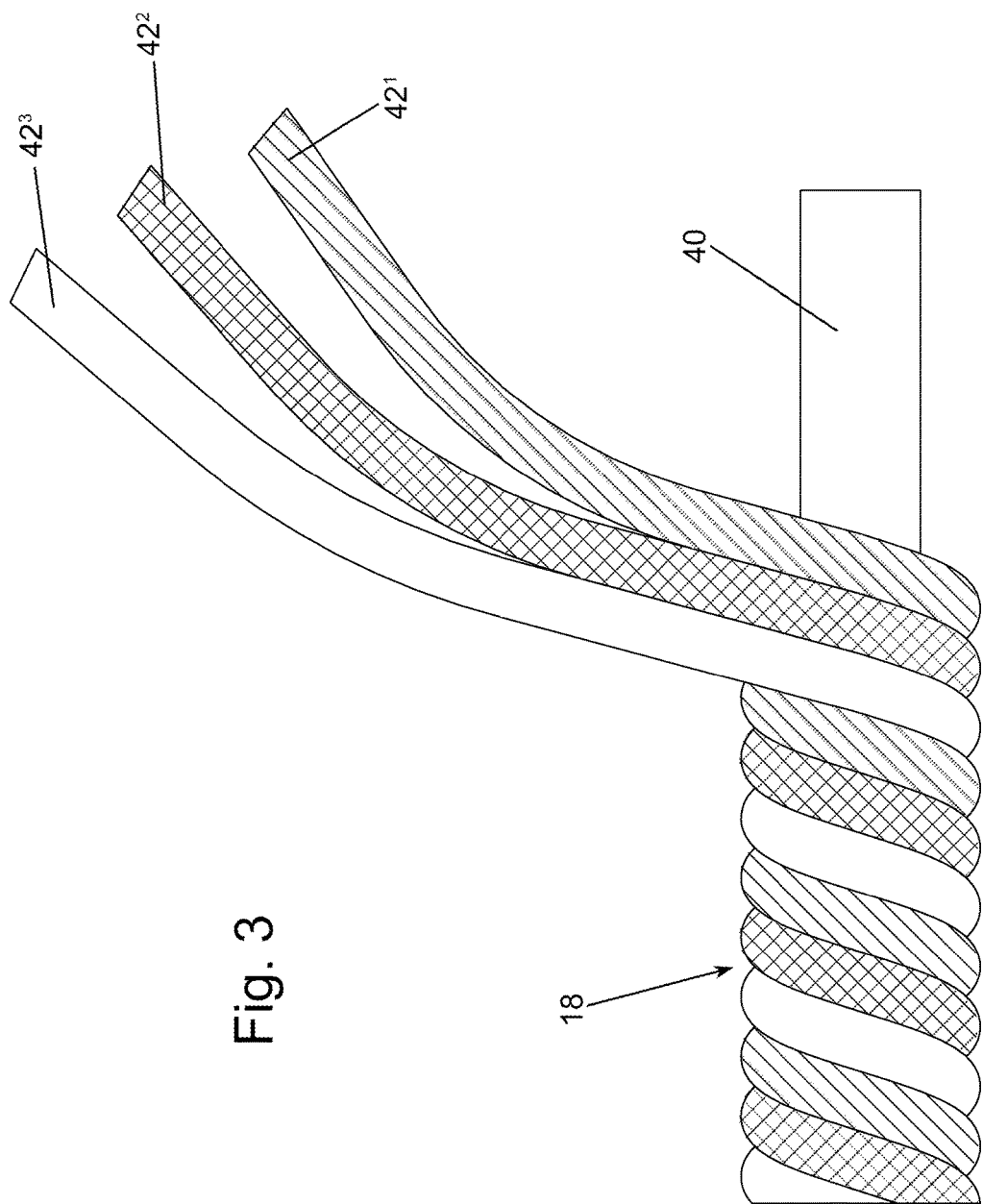
FIG. 3 is a schematic representation of an embodiment of the invention partially unwrapped.

An embodiment of the invention is illustrated in schematic, partially expanded view, in FIG. 3. In FIG. 3 a core, 40, has three wrap wires, $42^1$-$42^3$, wrapped thereon. In FIG. 3 the wrap wires are illustrated as partially unwrapped for the purposes of facilitating further understanding.

Figure 4:
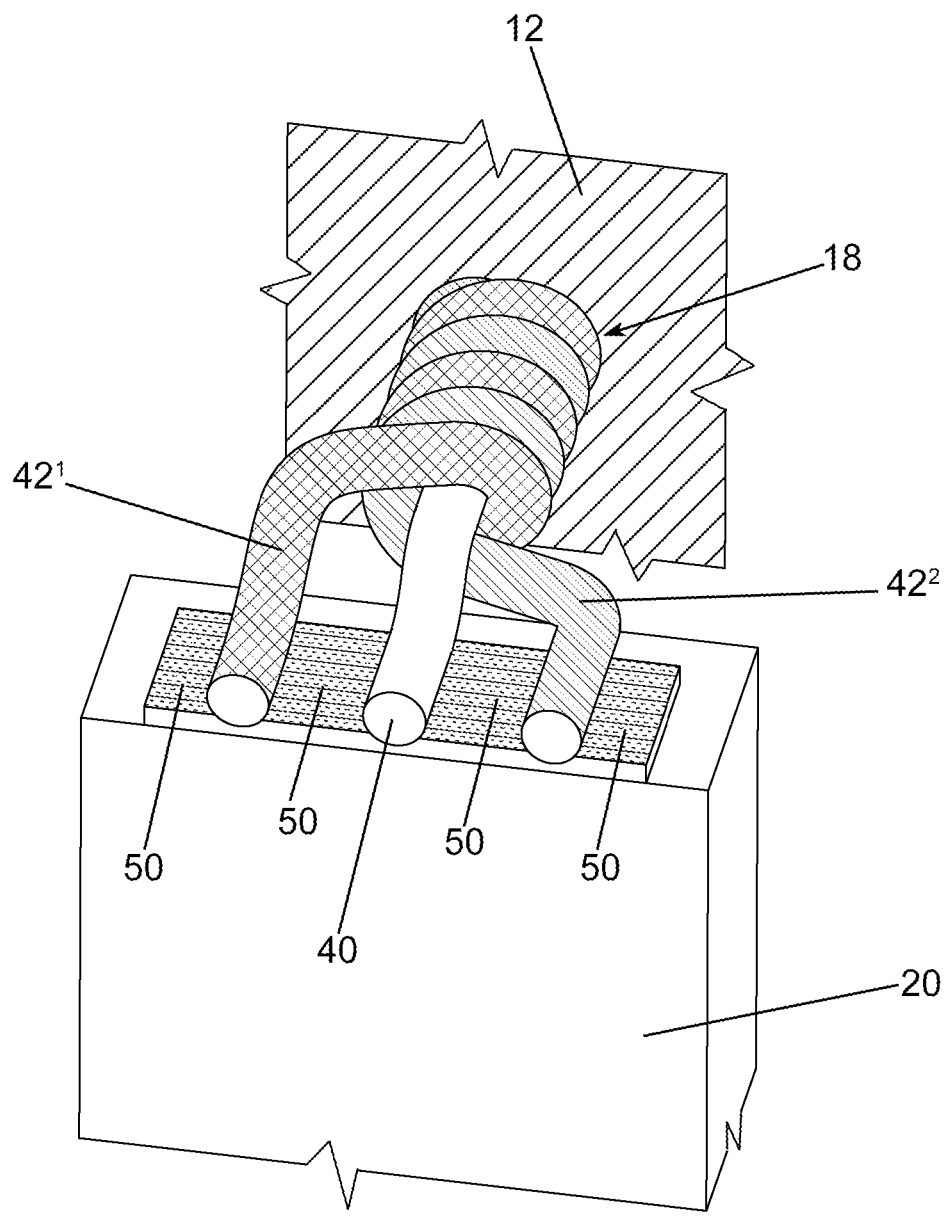
FIG. 4 is a schematic perspective view of a portion of an embodiment of the invention.

An embodiment of the invention is illustrated schematically in partial side view in FIG. 4. In FIG. 4, the core, 40, is in electrical contact with an anode terminal, 20, preferably by welding, although a conductive adhesive, 50, such as a solder or a transient liquid phase sintering adhesive can also be used. The braided lead wire, 18, extending from the anode, 12, shown in partial view, is partially unwound allowing the wrap wires, $42^1$ and $42^2$, to be in direct electrical contact with the anode terminal, 20, by the conductive adhesive, 50. Two wrap wires are illustrated in FIG. 4 for clarity with the understanding that each wrap wire is preferably in direct electrical contact with the anode termination. The term direct electrical contact as applied to the wrap wire as used herein, indicates electrical contact is not through the core or that the wrap wire is separately bonded to the anode terminal. The increased electrical contact provided by multiple wires significantly reduces the electrical resistance of the capacitor relative to a single wire anode.

Figure 5:
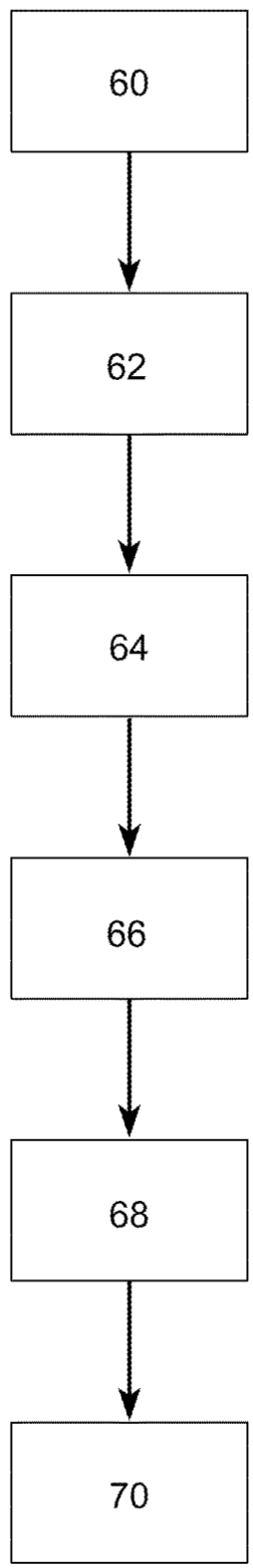
FIG. 5 is a flow chart representation of an embodiment of the invention.
Figure 6:
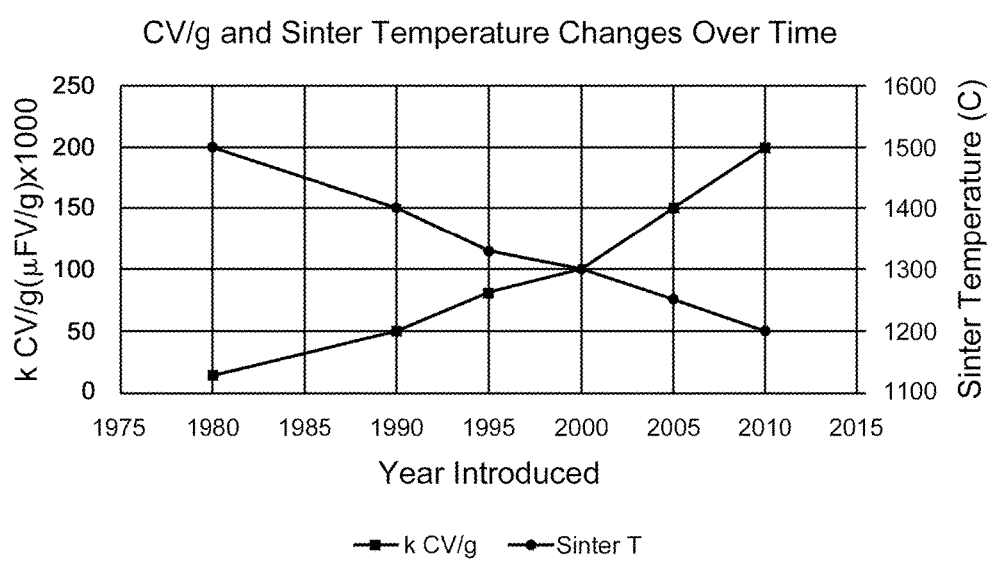
FIG. 6 is a graphical illustration of specific charge improvements as a function of time.

An embodiment of the invention will be described with reference to the flow chart of FIG. 5. In FIG. 5, a press is charged, 60, with an anode powder wherein the anode powder has a braided lead wire in the powder. The powder is pressed, with the braided lead wire constrained in the powder by compaction at 62 thereby forming an anode precursor. An advantage of the invention is that the powder forms a more integral physical contact around the braided lead wire than with a single wire thereby providing a stronger physical bond and improved electrical contact.

With continued attention to FIG. 5, the anode precursor is sintered at 64 to form a sintered anode which is then subjected to an oxidation treatment at 66 wherein a dielectric is formed on the surface of the anode. A cathode layer is formed on the dielectric at 68 thereby forming a capacitor. The capacitor is then finished at 70 wherein the anode and cathode terminations are attached and the entire assembly is encased, if desired, in a non-conductive resin.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Ta, Nb and NbO. An anode consisting essentially of Ta is most preferred. A particularly preferred anode is tantalum with a specific charge of at least 100,000 μFV/g and more preferably at least 150,000 μFV/g. In another embodiment the preferred anode comprises niobium with a specific charge of at least 50,000 μFV/g and more preferably at least 75,000 μFV/g.

The cathode is a conductor preferably comprising at least one of manganese dioxide and a conductive polymeric material. Particularly preferred conductive polymers include intrinsically conductive polymers most preferably selected from polypyrrole, polyaniline and polythiophene. Metals can be employed as a cathode material with valve metals being less preferred. The cathode is preferably formed by dipping, coating or spraying either a conductor or a conductive precursor. Conductive precursors are materials which form a conductor after heating or activation. The cathode may include multiple interlayers wherein adhesion layers are employed to improved adhesion between the conductor and the termination. Particularly preferred adhesion interlayers include carbon, silver, copper, or another conductive material as a plated layer or in a binder.

The dielectric is a non-conductive layer which is not particularly limited herein. The dielectric may be a metal oxide or a ceramic material. A particularly preferred dielectric is the oxide of a metal anode due to the simplicity of formation and ease of use. The dielectric is preferably formed by dipping the anode into an anodizing solution with electrochemical conversion. Alternatively, a dielectric precursor can be applied by spraying or printing followed by sintering to form the layer. When the dielectric is an oxide of the anode material dipping is a preferred method whereas when the dielectric is a different material, such as a ceramic, a spraying or coating technique is preferred.

The anode lead wire may be the same as the anode material or a conductive oxide thereof. Particularly preferred anode lead wires include Ta, Nb and NbO.

EXAMPLES

Example 1

A series of tantalum anodes were prepared in identical fashion with the exception of the anode lead wire wherein one set utilized a single cylindrical wire, as a control, and one set utilized a braided tantalum wire, as an inventive example. The anode dimensions were 0.200×0.196×0.038" (W×L×T) with the wire approximately centrally located in the face of egress and parallel to the L dimension. Each lead wire had a diameter of 0.015" and the powder was pressed to a density of 5.5 g/cm$^3$. The powder was a tantalum powder with a charge of 200,000 μFV/g. After formation the samples were subjected to a wire pull strength test wherein the force, in kgs, required to pull the wire from the anode was tested. The braided wire had a pull strength of 1.64 kgs compared to a pull strength for the control wire of 0.80 kgs indicating a significant improvement in the physical bond between the braided lead wire and the conventional single lead wire. A capacitor was formed from the anode, in identical fashion, and the wet leakage was tested resulting in a wet leakage of 0.24 nanoAmps/μFV for the braided lead wire and 0.65 nanoAmps/μFV for the control.

Example 2

A series of identical anodes were prepared with the difference being the use of a braided lead wire in some anodes and a standard single wire in other anodes. The anodes were prepared to have a nominal capacitance value of 330 uF and a rated voltage of 6.3 volts with dimensions of 0.094×0.070×0.044". In each case, the diameter of the wire was 0.015" (0.0381 mm) and it was pressed into the powder to a powder density of 6.5 g/cm$^3$. The powder was a tantalum powder with a charge of 200,000 μF-V/g sintered at 1185° C. Anodes from the same batch were subjected to a pull test with the results presented in Table 1:

TABLE 1

| Control (kg) | Braided Wire (kg) |
|---|---|
| 1.86 | 2.94 |
| 2.05 | 2.75 |
| 2.03 | 2.78 |
| 1.98 | 2.73 |
| 1.79 | 2.84 |

In the examples presented in Table 1 the controls typically pull out of the anode at failure whereas with the braided wire the anode broke as the wire was pulled from the anode thereby suggesting that the bond between the braided anode lead and compressed powder is stronger than the interparticle bond strength of the anode.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A solid electrolytic capacitor comprising:
a pressed powder anode;
a braided lead wire extending from said anode,
wherein said braided lead wire comprises a core and at least two wrap wires, and
each wrap wire is in contact with an adjacent wrap wire and the core;
a dielectric on said anode; and
a cathode on said dielectric.

2. The solid electrolytic capacitor of claim 1 further comprising an anode termination in electrical contact with said braided lead wire.

3. The solid electrolytic capacitor of claim 2 wherein said core and said wrap wires are in direct electrical contact with said anode termination.

4. The solid electrolytic capacitor of claim 1, wherein said braided lead wire comprises no more than 10 wraps.

5. The solid electrolytic capacitor of claim 4 wherein said braided lead wire comprises 3 wrap wires.

6. The solid electrolytic capacitor of claim 1 wherein said core has a first diameter and said wrap wires have a second diameter.

7. The solid electrolytic capacitor of claim 1 wherein said core and said wrap wires are the same material.

8. The solid electrolytic capacitor of claim 1 wherein said core and said wrap wires are not the same material.

9. The solid electrolytic capacitor of claim 1 wherein said braided lead wire has a diameter of at least one nanometer to no more than 0.75 mm.

10. The solid electrolytic capacitor of claim 9 wherein said braided lead wire has a diameter of at least 0.025 mm to no more than 0.25 mm.

11. The solid electrolytic capacitor of claim 1 wherein said anode comprises a valve metal or conductive oxide of said valve metal.

12. The solid electrolytic capacitor of claim 11 wherein said valve metal is selected from the group consisting of Al, W, Ta, Nb, Ti, Zr and Hf.

13. The solid electrolytic capacitor of claim 12 wherein said anode comprises a material selected from the group consisting of Ta, Nb and NbO.

14. The solid electrolytic capacitor of claim 13 wherein said anode comprises Ta with a specific charge density of at least 100,000 μFV/g.

15. The solid electrolytic capacitor of claim 14 wherein said anode comprises Ta with a specific charge of at least 150,000 μFV/g.

16. The solid electrolytic capacitor of claim 13 wherein said anode comprises Nb with a specific charge density of at least 50,000 μFV/g.

17. The solid electrolytic capacitor of claim 16 wherein said anode comprises Nb with a specific charge of at least 75,000 μFV/g.

18. An electronic device comprising the solid electrolytic capacitor of claim 1.

19. A method for forming a solid electrolytic capacitor comprising: pressing an anode powder with a braided lead wire therein to form an anode precursor with a braided lead wire extending therefrom, wherein said braided lead wire comprises a core and at least two wrap wires, and each wrap wire is in contact with an adjacent wrap wire and the core;
sintering said anode precursor to form a sintered anode;
forming a dielectric on said sintered anode;
forming a cathode on said dielectric;
and electrically connecting said braided lead wire to an anode termination.

20. The method for forming a solid electrolytic capacitor of claim 19 wherein said electrically connecting said braided lead wire includes directly electrically connecting said core to said anode termination and electrically connecting said wrap wires to said anode termination.

21. The method for forming a solid electrolytic capacitor of claim 19 wherein said braided lead wire comprises no more than 10 wrap wires.

22. The method for forming a solid electrolytic capacitor of claim 21 wherein said braid lead wire comprises 3 wrap wires.

23. The method for forming a solid electrolytic capacitor of claim 19 wherein said core has a first diameter and said wrap wires have a second diameter.

24. The method for forming a solid electrolytic capacitor of claim 19 wherein said core and said wrap wires are the same material.

25. The method for forming a solid electrolytic capacitor of claim 19 wherein said core and said wrap wires are not the same material.

26. The method for forming a solid electrolytic capacitor of claim 19 wherein said braided lead wire has a diameter of at least one nanometer to no more than 0.75 mm.

27. The method for forming a solid electrolytic capacitor of claim 26 wherein said braided lead wire has a diameter of at least 0.025 mm to no more than 0.25 mm.

28. The method for forming a solid electrolytic capacitor of claim 19 wherein said anode comprises a valve metal or conductive oxide of said valve metal.

29. The method for forming a solid electrolytic capacitor of claim 28 wherein said valve metal is selected from the group consisting of Al, W, Ta, Nb, Ti, Zr and Hf.

30. The method for forming a solid electrolytic capacitor of claim 29 wherein said anode comprises a material selected from the group consisting of Ta, Nb and NbO.

31. The method for forming a solid electrolytic capacitor of claim 30 wherein said anode comprises Ta with a specific charge of at least 100,000 μFV/g.

32. The method for forming a solid electrolytic capacitor of claim 31 wherein said anode comprises Ta with a specific charge of at least 150,000 μFV/g.

33. The method for forming a solid electrolytic capacitor of claim 30 wherein said anode comprises Nb with a specific charge of at least 50,000 μFV/g.

34. The method for forming a solid electrolytic capacitor of claim 33 wherein said anode comprises Nb with a specific charge of at least 75,000 μFV/g.

35. A solid electrolytic capacitor comprising:
a pressed powder anode;
a braided lead wire extending from said anode;
a dielectric on said anode;
a cathode on said dielectric;
wherein said braided lead wire comprises a core and at least one wrap wire wherein said core has a first diameter and said wrap wire has a second diameter; and
wherein said first diameter and said second diameter are the same.

36. A method for forming a solid electrolytic capacitor comprising:
pressing an anode powder with a braided lead wire therein to form an anode precursor with a braided lead wire extending therefrom;
sintering said anode precursor to form a sintered anode;
forming a dielectric on said sintered anode;
forming a cathode on said dielectric; and
electrically connecting said braided lead wire to an anode termination wherein said braided lead wire comprises a core and at least one wrap wire wherein said core has a first diameter and said wrap wire has a second diameter; and
wherein said first diameter and said second diameter are the same.

\* \* \* \* \*